MECHANICAL AMPLIFIER

Original Filed Feb. 13, 1967

JEREMY M. HARRIS
INVENTOR

BY Gray, Mase and Dunson, ATTORNEYS

United States Patent Office 3,625,075

Patented Dec. 7, 1971

3,625,075

MECHANICAL AMPLIFIER

Jeremy M. Harris, Worthington, Ohio, assignor to The Battelle Development Corporation, Columbus, Ohio Original application Feb. 13, 1967, Ser. No. 615,687, now Patent No. 3,491,603. Divided and this application Oct. 6, 1969, Ser. No. 864,107
Int. Cl. F16h *21/12;* G05b *11/00;* H04m *1/00*
U.S. Cl. 74—63 8 Claims

ABSTRACT OF THE DISCLOSURE

A rotating drum with two flexible elements wrapped around it, one end of each connected to input means on one side of the drum and the opposite end connected to output means on the opposite side. A multi-stage amplifier includes several sets of flexible elements. The distortion between input and output signals is minimal, and the response of the amplifier is very rapid.

This is a division of my copending U.S. patent application Ser. No. 615,687, filed Feb. 13, 1967, now U.S. Pat. 3,491,603.

This invention relates to a mechanical power amplifier based on the principle of a capstan force multiplier which is sensitive, bi-directional, with little back lash and very little inherent inertia. More particularly, it relates to a mechanical amplifier that may be used as a multi-stage amplifier.

Many types of amplifiers are in existence at the present time which may be classified in the two general categories of electronic amplifiers and mechanical amplifiers. Electronic amplifiers are typically used in public address systems, radios, television, etc. In the field of mechanical amplifiers, some common examples are power steering and power brakes. One basic requirement in the field of amplification is to increase energy level of a small input signal to a degree where it can either overpower a large resisting force or be used to drive other components in a servomechanism. In either case, there are certain inertial and friction forces that must be overcome if the desired result of faithful signal reproduction is to be achieved. If in prior amplifying devices, the amplified signal switches a motor on and off, there is a definite lag time both in the starting time of the motor and the inertia in the system that is to be activated by the output signal. In this invention, the "motor" is in a sense already running and is also responsible for amplification. A problem associated with electronic amplifiers is the cost of the electronic components. With common mechanical amplifiers, for example hydraulic amplifiers, there is a loss of "feel" associated therewith.

The amplifier described herein is especially useful for the amplification of audio signals on a direct mechanical basis.

Briefly described, this invention includes a stepped capstan drum having at least two flexible elements wrapped around each step of the drum with the portions of the flexible elements on one side of the capstan drum that emerge from the drum in the direction of rotation receiving an input signal and the flexible elements on the opposite side of the capstan drum that emerge against the direction of rotation connected to an output, each step in the capstan drum being a stage of amplification and the output of one stage of amplification being the input signal for the succeeding step of amplification.

This invention also includes a cylinder or drum having at least two flexible elements wrapped around the drum with the portions of the flexible elements emerging from the drum in the direction of rotation receiving an input signal and the ends of flexible elements of the opposite side connected to an output signal, the input signal being impressed upon the flexible elements by varying friction between at least one of said flexible elements and a moving surface.

It is an object of this invention to provide a multiple-stage mechanical amplifier capable of amplifying input signals of at least 1800 cycles per second with a power gain of at least 10,000, i.e., capable of amplifying signals in the audio range.

One advantage of this invention is the relatively low cost of the components as compared with other amplification systems.

Another advantage of this invention is that the elements transmitting the signal from the input source to the output load may be constructed of lightweight low inertia material to provide a relatively faithful correspondence between input and output signal and an extremely fast response.

Other objects and advantages will be apparent from the description that follows, the drawings, and the appended claims.

Figure 1:
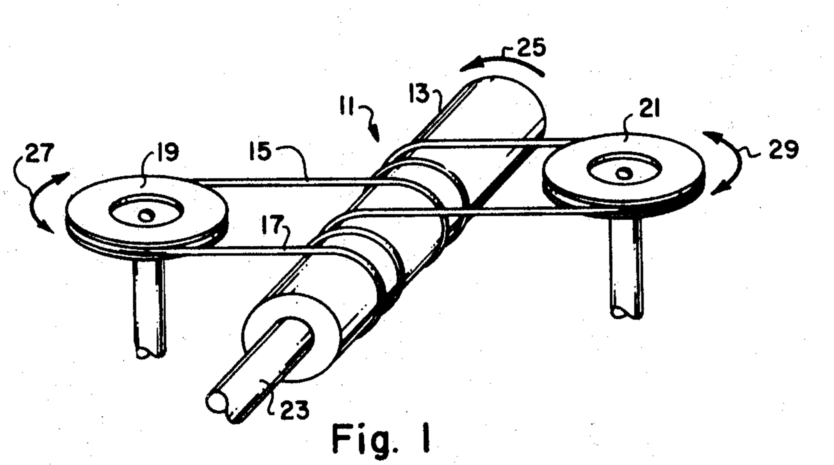
FIG. 1 is a perspective view of the basic elements that make up the invention herein described.

Referring to FIG. 1, the basic mechanical amplifier 11 includes a cylinder or drum 13, at least two flexible elements 15 and 17, an input means 19, and an output means 21. The drum 13 which is attached to a shaft 23 is connected to a power source (not shown) which rotates the drum at a constant speed in the direction of the arrow 25. The flexible elements 15 and 17 are stationary with respect to the drum (that is they slip) when there is no signal or movement applied at the input means 19 and such a condition also exists in the embodiments hereinafter described. When the pulley 19 is rotated in either direction as indicated by the arrow 27, it tightens or loosens the flexible elements 15 and 17 on the drum 13 and as a result the output pulley 21 is rotated in the same direction as indicated by the arrow 29. If, for example, the pulley 19 is rotated counterclockwise, the flexible element 15 is tightened on the drum 13 and the force on the flexible element 15 is amplified by the rotation of the drum 13 and moves the output 21 also counterclockwise but with a force that is considerably increased over the force applied to the pulley 19. Similarly, when the pulley 19 is rotated clockwise, the flexible element 17 is tightened on the drum 13 and the rotational effort of the drum is frictionally applied to the flexible element 17 and moves the pulley 21 clockwise. The important feature of this basic element is that it achieves bi-directional amplification with only one drum. A rotation of the input pulley 19 tightens the flexible element 15 or 17 on one side of the drum 13 but loosens it on the opposite side. The input signal for the amplifier is applied to that portion of the flexible elements 15 and 17 that emerge from the drum 13 with the direction of rotation while the output portion of the flexible elements 15 and 17 emerge from the drum 13 against the direction of rotation. This results in the appearance of a differential force at the output pulley 21, which is proportional to and co-directional with the input force, but is larger by a multiple $e^{\mu\beta}$, where $\mu$ is the coefficient of friction, $\beta$ is the wrap angle in radians and $e$ is the base of the Naperian logarithm (2.718). This factor, the torque gain, can be made anywhere from 4 to 50 or more with satisfactory results. Wraps of two or three turns are usually best with typical co-efficients of friction ranging from 0.1 to 0.3. The input and output portions of the flexible elements 15 and 17 need not emerge from the drum 13 at a 180° angle relationship, for example the input ends and output ends could be on the same same of the drum 13 or have a 90° relationship. The action of the amplifier 11 is very smooth and stable. Any tendency for the output to overrun or lag the input will result automatically in a corrective torque tending to restore synchronism. In this sense, the amplifier 11 is itself a miniature servosystem. The motion gain of the single drum form may be varied conveniently by using different size pulleys for output and input. The overall power gain of the amplifier will be the product of the force gain and the velocity gain. The flexible elements or cords 15 and 17 may be pinned to the pulleys 19 and 21 for restricted motion, or the rotation may be continuous.

Figure 2:
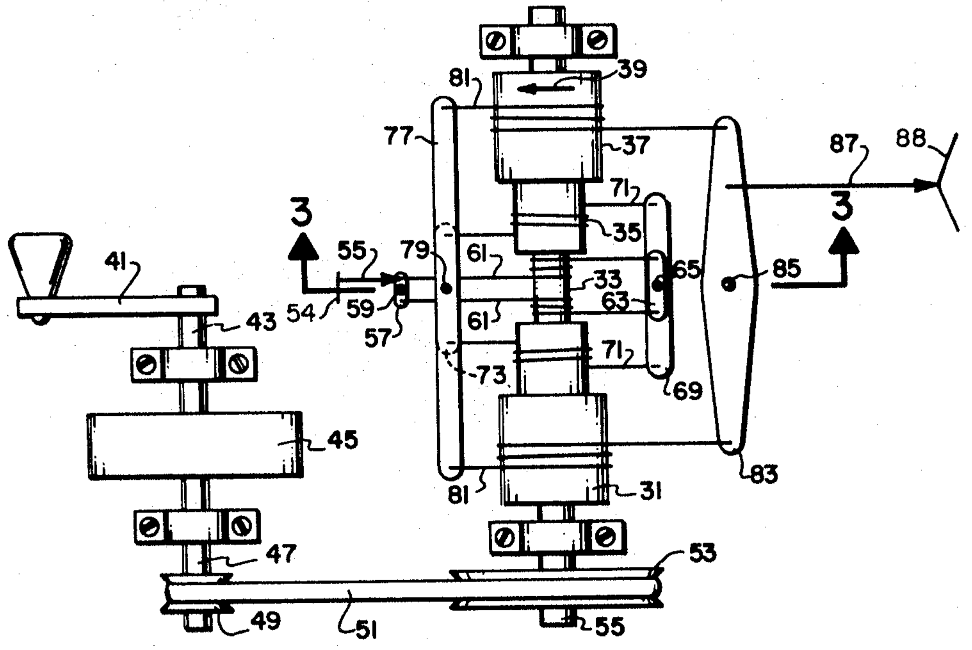
FIG. 2 is a diagram of the multi-stage mechanical amplifier.
Figure 3:
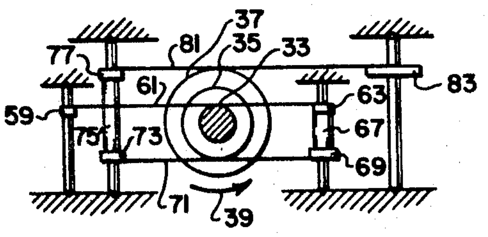
FIG. 3 is a cross-sectional view taken along the lines 3—3 of FIG. 2.

A remarkably compact multistage mechanical amplifier is shown in FIGS. 2 and 3. This embodiment of the invention is capable of amplifying input signals of at least 1800 cycles per second at least 10,000 times. The rotating drum 31 has a first section 33 having a small diameter, a second section 35 having a middle size diameter and a third section 37 having a large diameter. The purpose of the stepped diameters is to provide a drum surface velocity for each stage that is appropriate to the velocity gain of the previous stage. The drum 31 is rotated in the direction of the arrow 39. Suitable rotation means are provided such as a crank handle 41 connected to a shaft 43 which drives a speed increasing mechanism 45 connected to an output shaft 47. The output shaft 47 drives a pulley 49 connected by a belt 51 to a pulley 53. Pulley 53 is attached to a shaft 55 connected to the drum 31. The input (which in the audio-amplifier version is a small diaphragm 54 connected by a stiff wire to lever 57) represented by the arrow 55 is applied to a lever 57 which is pivoted at its midpoint 59. The pivoted lever 57 is connected to a pair of flexible elements 61—61 which are wrapped around the drum section 33 and connected to each end of an output lever 63 which is pivotally mounted at its center 65. Lever 57, flexible elements 61—61, drum section 33, and lever 63 represent the first stage of amplification. Lever 63 is rigidly connected by means of a column 67 (FIG. 3) to an input lever 69 also pivotally mounted at its center. The ends of lever 69 are connected to flexible elements 71—71 which are in turn wrapped around drum section 35 and connected to the ends of a lever 73 which is pivotally mounted at its center. Lever 69, flexible elements 71—71, drum section 35, and lever 73 represent the second stage of amplification. Lever 73 is directly connected by means of a column 75 to input lever 77 pivotally mounted at its center 79. The ends of the lever 77 are connected to flexible elements 81—81 which are wrapped around the third section 37 of the drum 31 and connected to the ends of the final output lever 83 which is pivotally mounted at its center 85. Lever 77, flexible elements 81—81, drum section 37, and lever 83 represent the third stage of amplification. Lever 83 is connected to an output which is represented by the arrow 87 (in the audio-amplifier this is a wire connected to the diaphragm 88 of a loud speaker). It should be noted that the flexible elements 61—61, 71—71, and 81—81, are wrapped around their respective drum sections 33, 35, and 37, in such a manner that any movement of the input lever 57 causes all the other levers to be driven in the same rotational sense. This is important to ensure that the amplification takes the "right direction." Again note that all input portions of the flexible elements emerge from the drum with the rotational direction and the output portions emerge against the rotational direction of the rotating drum. The multi-stage amplifier shown in FIGS. 2 and 3 may be used for a variety of purposes, however, the most striking example is observed when the input 55 is connected to a small diaphragm and the output 87 is connected to the diaphragm of a loud speaker and the human voice is amplified in the absence of a single watt of electrical power. One important requirement is that the surface speed of the drum must be faster than the linear movement of any of the flexible elements. The quality of amplification of the device shown in FIGS. 2 and 3 depends largely on reducing the inertia of the various elements that carry the signals. Response is decreased and distortion increased, for example as the weight of the levers is increased. The pivot points for the levers must have little friction and the flexible elements must be flexible in bending but should not stretch lengthwise.

It will be understood, of course, that while the forms of the invention herein shown and described constitute preferred embodiments of the invention, it is not intended to illustrate all possible forms of the invention. It will also be understood that the words used are words of description rather than of limitation and that various changes in shape, size, and arrangement of parts may be made without departing from the spirit and scope of the invention herein disclosed.

I claim:

1. Apparatus for mechanically amplifying signals and the like, comprising:

(a) a cylinder rotatable in one direction;

(b) a first pair of flexible elements wrapped around said cylinder, the pair of flexible element portions emerging from said cylinder with the direction of rotation being the input side and the pair of flexible element portions emerging from said cylinder against the direction of rotation being the output side;

(c) said pair of flexible element portions at said input side being connected and said pair of flexible element portions at said output side being connected to provide amplification from the input side to the output side; and (d) a second pair of flexible elements wrapped around said cylinder to provide connected input and connected output flexible element portions with the input flexible element portions of said second pair of flexible elements connected to the output portions of said first pair of flexible elements, said first pair of flexible elements carrying the first stage of amplification, said second pair of flexible elements carrying the second stage of amplification and the speed of the cylinder surface being faster than the speed of the linear movement of any of said flexible elements.

2. An amplifier as in claim 1, comprising means responsive to an input signal for moving one input element portion of the first stage in one direction while moving the other in the opposite direction.

3. An amplifier as in claim 2, wherein said input responsive means is connected to move said input element portions in such manner that at any instant either.

(i) a first said portion is tightened against the drum while the second is loosened, or (ii) the second portion is tightened against the drum while the first is loosened, or (iii) neither said portion is tightened or loosened.

4. An amplifier as in claim 2, wherein said input responsive means comprises a pivotable member connected on one side of its pivot point to one said input element portion and on the opposite side to the other said portion.

5. An amplifier as in claim 1, comprising output means responsive to the movement of the output element portions of the last stage.

6. An amplifier as in claim 5, wherein said output means comprises a pivotable member connected on one side of its pivot point to one said output element portion and on the opposite side to the other said portion.

7. A mechanical amplifier, comprising:
(a) a drum rotatable in one direction;
(b) at least two pairs of flexible elements wrapped around said drum, the pairs of flexible element portions emerging from said drum with the direction of rotation being the input side and the pairs of flexible element portions emerging from said drum against the direction of rotation being the output side;
(c) said pairs of flexible element portions comprising each input side being connected and said pairs of flexible element portions at each sail output side being connected to provide amplification from the input side to the output side;
(d) each said pair of flexible elements comprising a stage of amplification with the output side of each stage of amplification being connected to the input side of the succeeding stage of amplification; and
(e) the speed of the drum surface being faster than the speed of the linear movement of any of said flexible elements;
(f) wherein said drum is constructed of different diameters with a diameter corresponding to each stage of amplification, the flexible elements of the first stage of amplification being wrapped around the smallest diameter and the flexible elements of each succeeding stage of amplification being wrapped around a correspondingly larger diameter.

8. A mechanical amplifier, comprising:
(a) a drum rotatable in one direction;
(b) at least two pairs of flexible elements wrapped around said drum, the pairs of flexible element portions emerging from said drum with the direction of rotation being the input side and the pairs of flexible element portions emerging from said drum against the direction of rotation being the output side;
(c) said pairs of flexible element portions comprising each input side being connected and said pairs of flexible element portions at each said output side being connected to provide amplification from the input side to the output side;
(d) each said pair of flexible elements comprising a stage of amplification with the output side of each stage of amplification being connected to the input side of the succeeding stage of amplification; and
(e) the speed of the drum surface being faster than the speed of the linear movement of any of said flexible elements; and
(f) wherein the input of the first stage is connected to a first diaphragm and the output of the last stage is connected to a second diaphragm to mechanically amplify sound waves.

References Cited

UNITED STATES PATENTS

| | | | |
|---|---|---|---|
| 2,113,164 | 4/1938 | Williams | 318—28 |
| 2,828,635 | 4/1958 | Johnson et al. | 74—89.22 |
| 2,859,629 | 11/1958 | Parker et al. | 74—89.22 |
| 3,014,463 | 12/1961 | Krohn | 74—89.22 |
| 3,044,312 | 7/1962 | Hall et al. | 74—89.22 |
| 3,141,343 | 7/1964 | Rieckenberg | 74—89.22 |
| 3,163,055 | 12/1964 | Jeffree | 74—89.2 |
| 3,203,270 | 8/1965 | Booth | 74—89.22 |
| 3,273,408 | 9/1966 | Nagel et al. | 74—89.22 |

WILLIAM F. O' DEA, Primary Examiner

W. S. RATLIFF, Jr., Assistant Examiner

U.S. Cl. X.R.

318—28; 179—1 R

Dedication 3,625,075.—*Jeremy M. Harris*, Worthington, Ohio. MECHANICAL AMPLIFIER. Patent dated Dec. 7, 1971. Dedication filed May 7, 1973, by the assignee, *The Battelle Development Corporation.*

Hereby dedicates to the People of the United States the entire remaining term of said patent.

[*Official Gazette November 27, 1973.*]